US009686766B2

(12) United States Patent
Shu et al.

(10) Patent No.: US 9,686,766 B2
(45) Date of Patent: Jun. 20, 2017

(54) LOCATION POSITIONING USING M2M ECOSYSTEM

(71) Applicant: Telefonaktiebolaget LM Ericsson (publ), Stockholm (SE)

(72) Inventors: Di Shu, Shanghai (CN); Yang Zhang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/913,261

(22) PCT Filed: Aug. 26, 2013

(86) PCT No.: PCT/CN2013/082267
§ 371 (c)(1),
(2) Date: Feb. 19, 2016

(87) PCT Pub. No.: WO2015/027373
PCT Pub. Date: Mar. 5, 2015

(65) Prior Publication Data
US 2016/0205652 A1    Jul. 14, 2016

(51) Int. Cl.
*H04W 24/00* (2009.01)
*H04W 64/00* (2009.01)
(Continued)

(52) U.S. Cl.
CPC ........ *H04W 64/00* (2013.01); *G06F 17/3087* (2013.01); *G06F 17/30241* (2013.01); *H04W 4/005* (2013.01); *H04W 4/02* (2013.01)

(58) Field of Classification Search
CPC ....... H04W 4/02; H04W 4/005; H04W 4/025; H04W 64/00; H04W 64/003
(Continued)

(56) References Cited

U.S. PATENT DOCUMENTS 6,915,123 B1 * 7/2005 Daudelin .............. H04W 64/00
455/410
8,830,909 B1 * 9/2014 Octeau .................. H04W 4/025
370/328
(Continued)

FOREIGN PATENT DOCUMENTS

CN    102573049 A    7/2012
CN    102638889 A    8/2012
(Continued)

OTHER PUBLICATIONS

International Search Report and Written Opinion of the International Searching Authority, Application No. PCT/CN2013/082267, May 29, 2014.
(Continued)

*Primary Examiner* — Temica M Beamer
(74) *Attorney, Agent, or Firm* — Sage Patent Group

(57) ABSTRACT

Machine-to-machine (M2M) devices are used to enable the automatic collection of fingerprint data without human intervention at various locations in a wireless communication system. A location server receives fingerprint data collected by one or more M2M devices positioned at fixed locations in the wireless communication system, and stores the fingerprint data received for each of the one or more M2M devices in the location database to associate the received fingerprint data with the fixed location of the corresponding M2M device. The collected fingerprint data characterizes the radio environment at the fixed location of the corresponding M2M device, where each M2M device corresponds to one fixed location in a fingerprint grid.

23 Claims, 5 Drawing Sheets

(51) Int. Cl.
*G06F 17/30* (2006.01)
*H04W 4/00* (2009.01)
*H04W 4/02* (2009.01)

(58) Field of Classification Search
USPC .................. 455/456.1, 456.2, 456.5, 456.6
See application file for complete search history.

(56) References Cited

U.S. PATENT DOCUMENTS

| | | | |
|---|---|---|---|
| 8,929,924 B2* | 1/2015 | Wirola | H04B 17/0072 |
| | | | 455/456.1 |
| 2004/0098395 A1 | 5/2004 | Hisano | |
| 2004/0203856 A1 | 10/2004 | Wigren et al. | |
| 2005/0283623 A1 | 12/2005 | Vanderheyden et al. | |
| 2011/0207477 A1 | 8/2011 | Siomina et al. | |
| 2012/0302254 A1 | 11/2012 | Charbit et al. | |
| 2013/0033999 A1 | 2/2013 | Siomina et al. | |
| 2014/0018095 A1* | 1/2014 | Parvizi | H04W 4/043 |
| | | | 455/456.1 |
| 2014/0073353 A1* | 3/2014 | Shkedi | G01S 5/0252 |
| | | | 455/456.1 |
| 2014/0099970 A1* | 4/2014 | Siomina | G01S 19/49 |
| | | | 455/456.1 |
| 2014/0308976 A1* | 10/2014 | Garin | H04W 4/023 |
| | | | 455/456.2 |

FOREIGN PATENT DOCUMENTS

| | | |
|---|---|---|
| CN | 102883262 A | 1/2013 |
| CN | 103068035 A | 4/2013 |
| CN | 103152823 A | 6/2013 |
| WO | WO 2008/048059 A1 | 4/2008 |

OTHER PUBLICATIONS

Shi et al., "AECID Fingerprinting Positioning Performance", *Proc. Globecomm 2009*, Honolulu, HI, Nov. 30-Dec. 4, 2009, pp. 2767-2772.

Wigren, "Adaptive Enhanced Cell-ID Fingerprinting Localization by Clustering of Precise Position Measurements", *IEEE Transactions on Vehicular Technology*, vol. 56, No. 5, Sep. 2007, pp. 3199-3209.

Supplementary European Search Report, Application No. 13 89 2388, Feb. 21, 2017.

* cited by examiner

LOCATION POSITIONING USING M2M ECOSYSTEM

CROSS REFERENCE TO RELATED APPLICATION

This application is a 35 U.S.C. §371 national stage application of PCT International Application No. PCT/CN2013/082267, filed on Aug. 26, 2013, the disclosure and content of which is incorporated by reference herein in its entirety. The above-referenced PCT International Application was published in the English language as International Publication No. WO 2015/027373 A1 on Mar. 5, 2015.

TECHNICAL FIELD

The invention disclosed herein relates generally to radio fingerprint data collection in a wireless communication network and, more particularly, to methods and apparatus enabling the collection of such radio fingerprint data using machine-to-machine devices.

BACKGROUND

Radio fingerprinting techniques, also known as Radio Pattern Matching or Radio Signature positioning, represent a family of Path Loss based technologies that rely on matching the Radio Frequency (RF) environment (as experienced by a UE) to the known or estimated or otherwise mapped characteristics of the larger RF System in which the UE is operating. Information from the UE, including measurements of neighbor cell signal strengths, time delay and other network parameters, form the basis of the RF environment to be compared to the established system database. The intent of this approach is to mitigate the negative impacts of anomalies within the RF environment that challenge the accuracy of trilateration technologies (e.g., multipath and reflection).

There are growing market segments for location services that require both location accuracy and user transparency (Government Surveillance and Lawful Intercept); these services cannot be addressed with location technologies that require UE support or modification (including assisted GNSS (A-GNSS), observed time difference of arrival (OT-DOA), etc.). Additionally, Emergency Service applications require a level of location accuracy that cannot be met with Cell-ID and RTT. The potential benefits of fingerprinting and the relative ease with which this location method can be adopted in the Universal Terrestrial Radio Access Network (UTRAN) indicate that it is appropriate that the technology be included in the UTRAN to support the services noted above, as well as for cooperative deployment with satellite-based systems (A-GPS, A-GNSS, etc.) to support "Hybrid" location technologies for Location Based Services (LBS).

Fingerprinting positioning methods rely on "fingerprint" data stored in a database for multiple different locations in the wireless network, where a location of a UE is determined based on comparisons between measurements made by the UE and the stored fingerprint data. For example, a location server determines the location of the UE by determining which set of stored fingerprint data most closely match the measurements made by the UE. The location server then determines the location of the UE based on the location coordinates corresponding to the most closely matching fingerprint data.

The accuracy of fingerprinting techniques relies on the accuracy of the stored fingerprint data, and the resolution provided by the various data points of the stored data. Conventional techniques typically rely on manual data collection for populating the fingerprint database. For example, an operator may go into the field with a GPS-enabled cellular telephone to collect new fingerprint data for multiple new locations in the wireless network. Such manual data collection methods are time consuming and expensive. Thus, there is an interest in cost-effective and time-efficient techniques that facilitate the population of a fingerprint database so as to achieve a desired accuracy.

SUMMARY

The solution disclosed herein uses machine-to-machine (M2M) devices to enable the automatic collection of fingerprint data without human intervention at various locations in a wireless communication system. An exemplary method implemented by a location server in a wireless communication system provides ways for collecting data for storage in a location database in the wireless communication system. The method comprises receiving fingerprint data collected by one or more M2M devices at fixed locations in the wireless communication system, and storing the fingerprint data received for each of the one or more M2M devices in the location database to associate the received fingerprint data with the location of the corresponding M2M device. Each of the one or more M2M devices is configured for communication with the location server without human intervention. The collected fingerprint data characterizes the radio environment at a location of the corresponding M2M device, where each M2M device corresponds to one fixed location in a fingerprint grid.

An exemplary location server in a wireless communication system comprises a receiver interface circuit and a processing circuit. The receiver interface circuit receives fingerprint data collected by one or more machine-to-machine (M2M) devices in the wireless communication system, where each of the one or more M2M devices are configured for communication with the location server without human intervention. The collected fingerprint data characterizes the radio environment at a location of the corresponding M2M device, where each M2M device corresponds to one fixed location in a fingerprint grid. The processing circuit store the fingerprint data received for each of the one or more M2M devices in a location database in the wireless communication system to associate the received fingerprint data with the location of the corresponding M2M device.

An exemplary method involves collecting data for a location database in a wireless communication system at an M2M device at a fixed location within a fingerprint grid, where the M2M device is configured for communication with a remote network node without human intervention. The method comprises collecting fingerprint data based on a current wireless environment, and transmitting the collected fingerprint data for storage in the location database to associate the fingerprint data with the location of the corresponding M2M device. The collected fingerprint data characterizes the radio environment at the fixed location of the M2M device.

An exemplary M2M device at a fixed location within a fingerprint grid comprises a collection circuit and a wireless transmitter, wherein the M2M device is configured for communication with a remote network node without human intervention. The collection circuit collects fingerprint data based on a current wireless environment. The collected fingerprint data characterizes the radio environment at the fixed location of the M2M device. The wireless transmitter transmits the collected fingerprint data for storage in the location database to associate the fingerprint data with the location of the corresponding M2M device.

DETAILED DESCRIPTION

Figure 1:
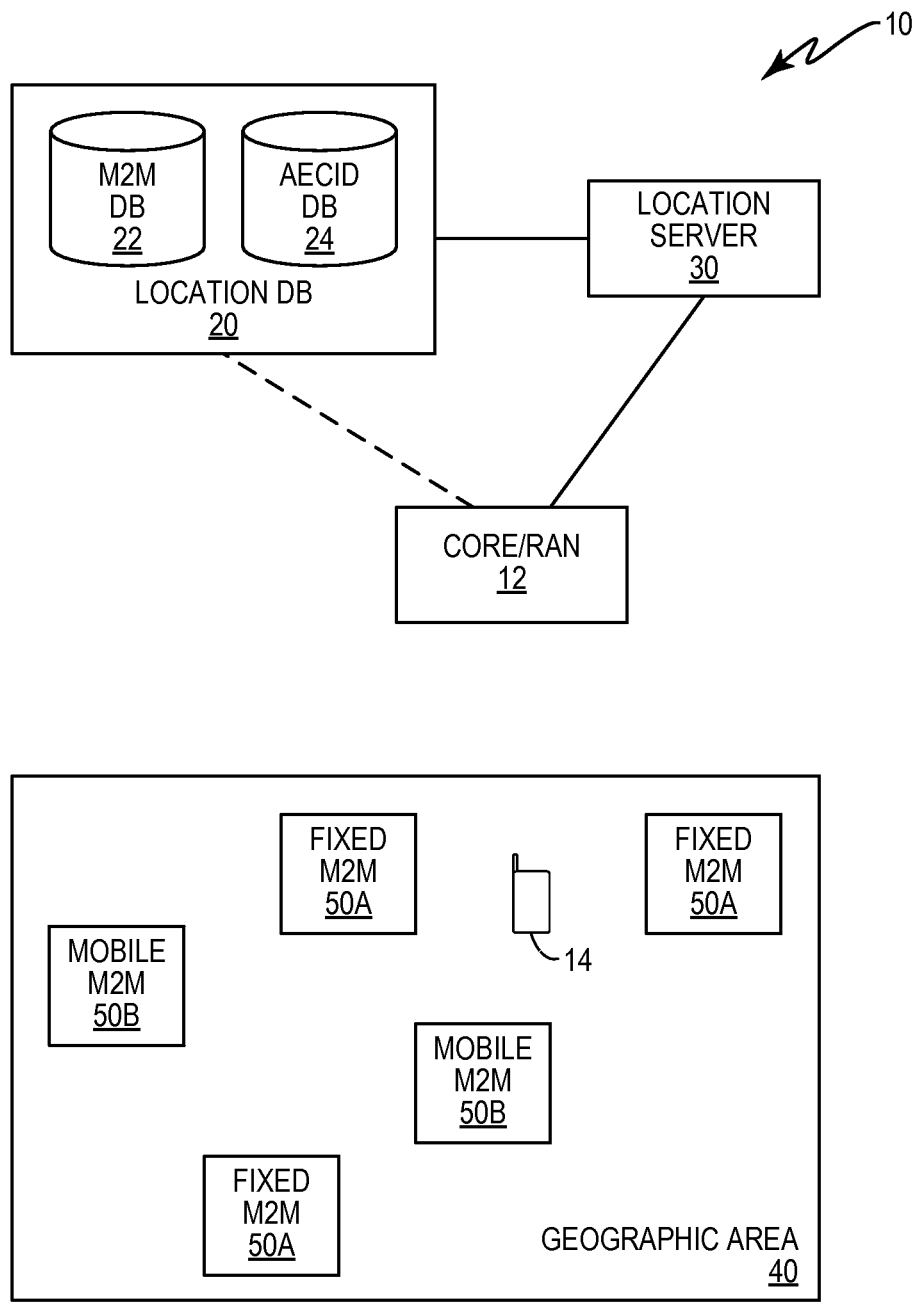
FIG. 1 shows a block diagram of a wireless communication system according to one exemplary embodiment.

Referring now to the drawings, exemplary embodiments of the invention will be described in the context of a wireless communication system, e.g., a Third Generation Partnership Project (3GPP)/Long Term Evolution (LTE) system. Those skilled in the art will appreciate, however, that the principles and techniques disclosed herein may be practiced in other types of wireless communication systems, e.g., Wideband Code Division Multiple Access (WCDMA) systems.

Fingerprinting positioning algorithms operate by creating a fingerprint for each location point of a fine coordinate fingerprint grid that covers a geographic area of the wireless communication system, where the fingerprint and the corresponding location are stored in a database. For each location, the fingerprint data may, e.g., include:

The cell IDs that are detected by the terminal.

Quantized path loss or signal strength measurements, with respect to multiple base stations, performed by the UE.

Quantized Round Trip Time (e.g., RTT in WCDMA), Timing Advance (e.g., TA in GSM and LTE), or UE reception-transmission time difference (e.g., in LTE).

Quantized noise rise, e.g., representing the load of a CDMA system, for each location.

Quantized signal quality, e.g., received signal quality (RxQual) in GSM, the ratio of the average energy of a chip signal to the spectral density of noise (Ec/N0) in WCDMA, and Reference Signal Received Quality (RSRQ) in LTE.

Radio connection information, e.g., associated with the RAB.

Quantized time.

Quantized angle of arrival (AoA) information.

Fingerprinting positioning techniques are typically described in terms of a fine coordinate fingerprint grid, where each point in the fingerprint grid represents a unique location in the geographic area. As used herein, the term "grid" represents a collection of unique grid points, where each grid point corresponds to one multi-dimensional location in the geographic area, and where a grid or different parts of a grid may have different scales depending on the desired position accuracy and/or location, e.g., city center vs. country. The term "grid" as used herein includes equally-spaced and unequally-spaced grid points. Whenever a position request arrives at the network, fingerprint data is first measured by the UE, after which a location server looks up the location of the UE in a location database using the fingerprint measurements provided by the UE. The determined location is then reported. This process requires that each stored set of fingerprint data have a unique location within the geographic area.

The accuracy of the fingerprint data stored in the database directly impacts the accuracy of any fingerprinting location methods that rely on such data. The accuracy of the stored fingerprint data depends on the quality and quantity of the collected measurements. One option for populating a fingerprint database would be to perform an extensive surveying operation that manually performs fingerprinting radio measurements repeatedly for all desired coordinate locations of the geographic area. For example, one or more operators may perform driving tests to collect the fingerprint data using tools such as TEMS, a driving test product offered by ASCOM. A disadvantage of this approach is the associated high cost (both in time and money) that occurs as a result of the labor required to manually collect such data. For example, every time new or updated measurements are required (e.g., due to a change in the network and/or a desire to add a new location data point), one or more individuals must drive around the geographic area and collect the requisite data for each location. Further, such driving tests are not effective for the collection of indoor data. Alternatively or additionally, online collection may be used, e.g., using Assisted Global Navigation Satellite System (A-GNSS) testing. For example, A-GNSS testing may be performed for a particular UE to determine fingerprint data for a current location of the UE. Such methods are not effective if the penetration of an A-GNSS capable phone is high. Further, such methods have privacy concerns and may also have other undesirable side effects, e.g., large power consumption that quickly exhausts the battery power of the UE.

The solution presented herein solves these problems through the use of machine-to-machine devices. FIG. 1 shows a block diagram of a wireless communication system 10 applicable to fingerprinting techniques comprising a Core Network/RAN 12, a location database 20, a location server 30, and a geographic area 40 comprising a UE 14 and multiple machine-to-machine (M2M) devices 50, e.g., "fixed" M2M devices 50A positioned at fixed locations in the geographic area 40 and "mobile" M2M devices 50B that may move around within the geographic area 40 and into/out of the geographic area 40. The geographic area 40 comprises any sized or shaped area within the system 10, and generally represents a fingerprint grid of unique grid points, where each grid point corresponds to a unique multi-dimensional location, e.g., the location of an M2M device 50. The Core Network/RAN 12 wirelessly interfaces with the UE 14 and the M2M devices 50 according to any known standards/techniques. The location database 20 stores the collected fingerprint data and the corresponding locations. The location database 20 may include any type of fingerprinting database, including but not limited to, an M2M database 22 and an Adaptive Enhanced Cell ID (AECID) database 24. The M2M database 22 generally stores the fingerprint data collected by the M2M devices 50 in the geographic area 40. The AECID database 24 stores fingerprint data specific to AECID fingerprint positioning, which generally refines basic or other fingerprint positioning methods.

To determine the location of the UE 14 using fingerprint techniques, the UE 14 measures fingerprint data characterizing the radio environment of the UE 14 at the current location of the UE 14. The UE 14 provides the measured fingerprint data to the location server 30, which determines the location of the UE 14 within the geographic area 40 based on a comparison between the fingerprint measurements provided by the UE 14 and the fingerprint data stored in the database 20.

To populate the location database 20, the solution disclosed herein uses the M2M devices 50 in the geographic area 40. Each M2M device 50 is located at a unique location within the geographic area 40, e.g., a unique geographical location having unique latitude/longitude coordinates, a unique civic location, e.g., a building, street, postal code, etc. As used herein, the term "M2M device" refers to an intelligent, communications-enabled device that wirelessly communicates with a server in the system 10 without human intervention. Exemplary M2M devices 50 include those that autonomously collect and send data to a supporting server via wireless link, autonomously monitor one or more conditions proximate the M2M device, notify a supporting server of a condition, problem, or alarm, and/or autonomously control an associated device responsive to a command received from a supporting server. For example, M2M devices 50 may include, but are not limited to, sensors, utility meters, security/fire alarm systems, ventilation and air-conditioning sensors, medical devices, traffic cameras, street light sensors, and the like. While FIG. 1 shows only five M2M devices 50, it will be appreciated that the geographic area 40 may include any number of M2M devices 50, and generally includes enough M2M devices 50 to achieve the desired coordinate resolution, e.g., to achieve the desired fine coordinate "grid" used by the location server 30 to determine the location of a UE 14 within the geographic area 40.

Figure 2:
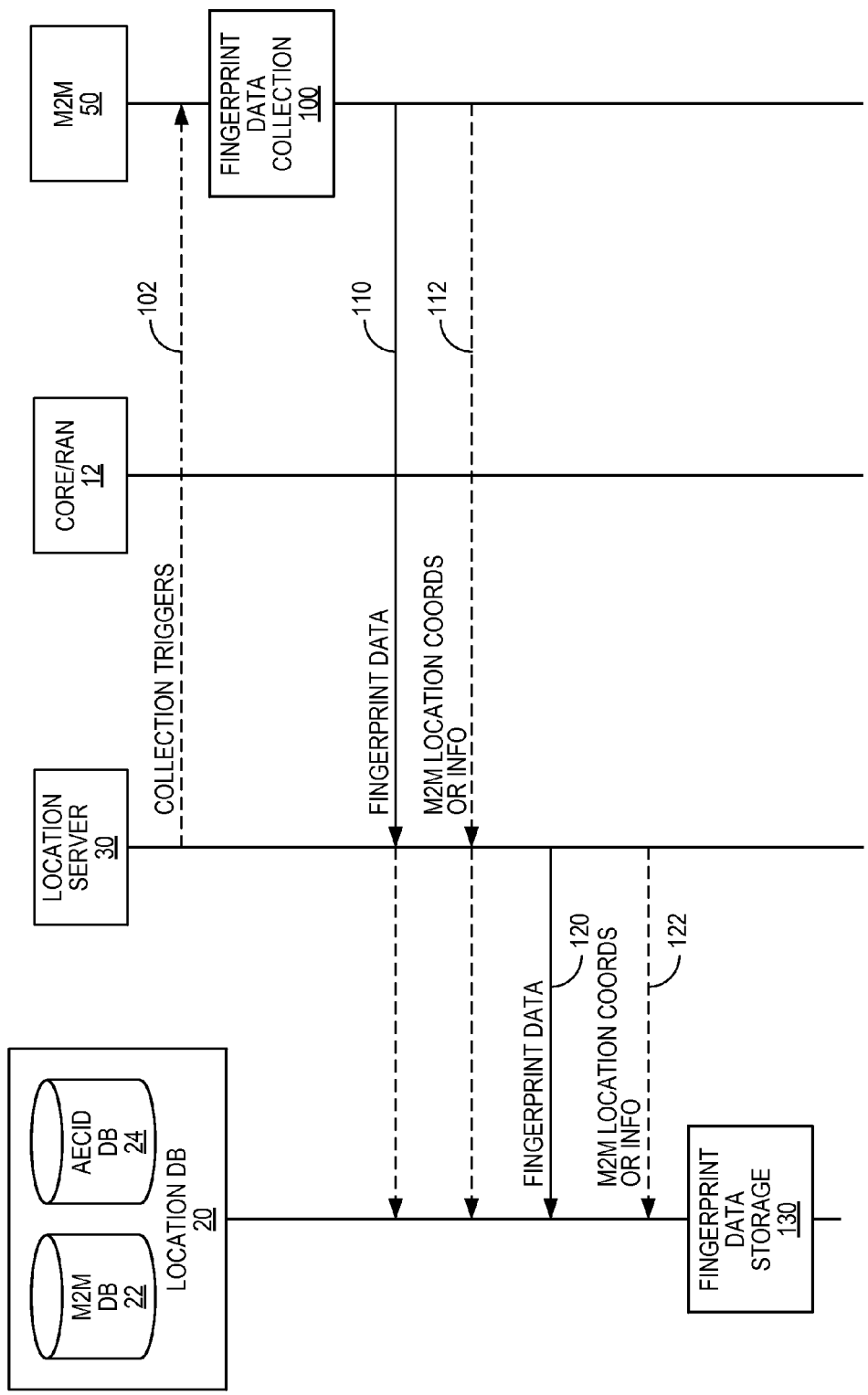
FIG. 2 shows a flow diagram for collecting and storing fingerprint data according to one exemplary embodiment.

FIG. 2 shows a flow diagram illustrating the collection of fingerprint data using M2M devices 50. Each M2M device 50 collects fingerprint data based on a current wireless environment of the M2M device 50 (item 100). The collected fingerprint data characterizes the radio environment at the location of the M2M device 50. The M2M device 50 then sends the collected fingerprint data to the location server 30 or directly to the location database 20 for storage in the location database 20 (items 110, 120), e.g., via cellular communications, WiFi communications, and the like. The location database 20 stores the received fingerprint data along with the location coordinates of the M2M device 50 that collected the fingerprint data (item 130).

Figure 3:
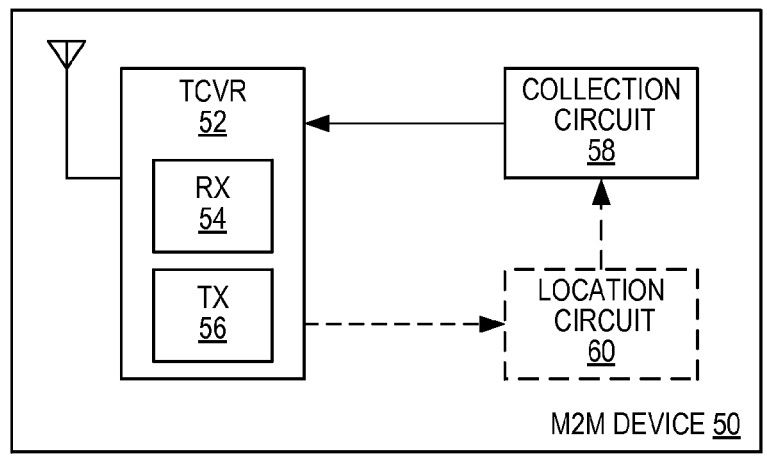
FIG. 3 shows a block diagram of the M2M device of FIGS. 1 and 2 according to one exemplary embodiment.

FIG. 3 shows a block diagram of an exemplary M2M device 50 comprising a transceiver circuit 52 (including a receiver 54 and a transmitter 56) and a collection circuit 58. The collection circuit 58 collects fingerprint data based on the current wireless environment of the M2M device 50 at the current location of the M2M device 50. Exemplary fingerprint data includes, but is not limited to:

The cell IDs that are detected by the terminal.
Quantized path loss or signal strength measurements, with respect to multiple base stations, performed by the UE.
Quantized Round Trip Time (e.g., RTT in WCDMA), Timing Advance (e.g., TA in GSM and LTE), or UE reception-transmission time difference (e.g., in LTE).
Quantized noise rise, e.g., representing the load of a CDMA system, for each location.
Quantized signal quality, e.g., received signal quality (RxQual) in GSM, the ratio of the average energy of a chip signal to the spectral density of noise (Ec/N0) in WCDMA, and Reference Signal Received Quality (RSRQ) in LTE.
Radio connection information, e.g., associated with the RAB.
Quantized time.
Quantized angle of arrival (AoA) information.

In some embodiments, the collection circuit 58 collects the fingerprint data responsive to a collection trigger received from the location server 30 by the receiver 54 (item 102 in FIG. 2). In other embodiments, the collection circuit 58 periodically implements the fingerprint data collection. In any event, the transmitter 56 sends the collected fingerprint data to the network, e.g., to the location server 30 and/or to the location database 20, for storage in the location database 20. In some embodiments, the transmitter 56 sends the collected fingerprint data only when a difference between the newly collected fingerprint data and previously collected fingerprint data is sufficiently large, e.g., exceeds a threshold.

For example, transmitter 56 may transmit the collected fingerprint data to the location server 30 (item 110 in FIG. 2), where the location server 30 subsequently provides the received data to the location database 20 (item 120 in FIG. 2), which may referred to as "online" data collection. Alternatively, the transmitter 56 may provide the collected fingerprint data directly to the location database 20 (dashed part of item 110), which may be referred to as an "offline" data collection.

The M2M device 50 may also include a location circuit 60 configured to determine the location of the M2M device 50 using any known techniques, e.g., satellite-based positioning systems, e.g., GPS, Galileo, and GLONASS, Time of Arrival (TOA), RTT, etc. Transmitter 56 then provides the location coordinates for the M2M device 50 to the location server 30/location database 20, e.g., with the collected fingerprint data or at some other desirable time (items 112, 122). In one embodiment, UE signal measurements may be used to determine the location of the M2M device 50. For example, the collection circuit 58 may be configured to measure one or more signals transmitted by a UE 14 proximate the M2M device 50 to determine one or more signal measurements associated with such transmitted signals. In this embodiment, the transmitter 56 sends the UE signal measurements to the location server 30, which in this case knows the location of the UE 14, to assist the location server 30 in determining a location of the M2M device 50.

Figure 4:
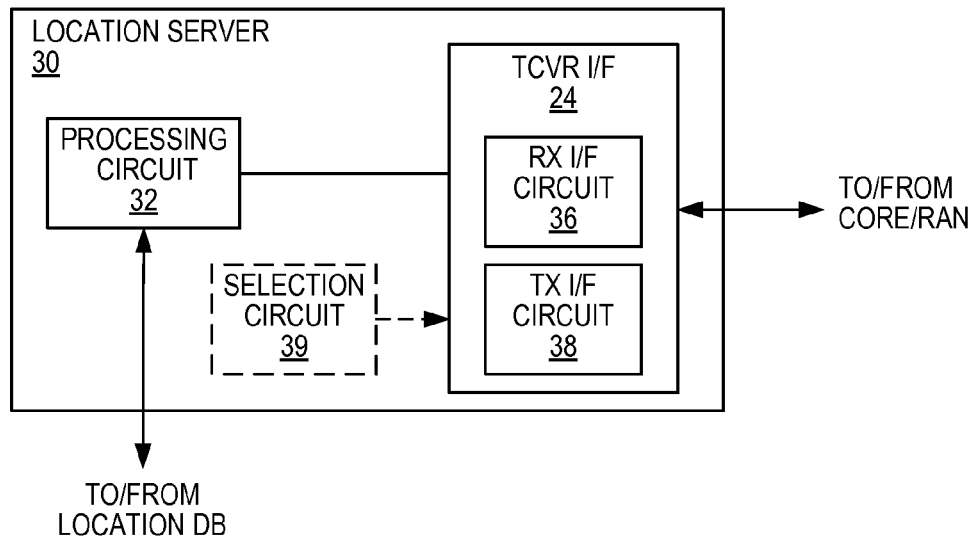
FIG. 4 shows a block diagram of the location server of FIGS. 1 and 2 according to one exemplary embodiment.

FIG. 4 shows a block diagram of a location server 30 comprising a processing circuit 32 and a transceiver interface circuit 34 according to one exemplary embodiment. The transceiver interface circuit 34 includes a receiver interface circuit 36 and a transmitter interface circuit 38. The receiver interface circuit 36 receives the fingerprint data collected by the M2M device(s) 50. The processing circuit stores the received fingerprint data in the location database 20 to associate collected fingerprint data with the location of the corresponding M2M devices 50.

As noted above, in some embodiments, the location server 30 may trigger the data collection at one or more of the M2M devices 50. To that end, the location server 30 may include a selection circuit 39 that selects one or more of the M2M devices 50 in the geographic area 40. For example, the selection circuit may select one or more M2M devices 50 that are near a target area, and/or that each are positioned in a location known to a desired level of accuracy. The transmitter interface circuit 38 subsequently sends a collection trigger to each of the selected M2M devices 50 to trigger the collection of the fingerprint data at the selected devices 50, where the trigger may, e.g., be event-based, time-based, spatial-based, or the like.

Location database 20 stores the received fingerprint data along with the location of the M2M device 50 that collected the fingerprint data. In some embodiments, e.g., the location server 30 and/or location database 20 already know the location coordinates of the corresponding M2M device, and thus the location database 20 stores the collected fingerprint data with the appropriate location coordinates. In other embodiments, the M2M devices 50 provide their location coordinates (or location information associated with the location coordinates) along with or separately from the collected fingerprint data (items 112, 122), as previously discussed. In yet another embodiment, the receiver interface circuit 36 may receive signal measurements (e.g., location information) associated with signal transmission(s) between an M2M device 50 and a UE 14 proximate the M2M device 50. In this case, the processing circuit 32 is further configured to determine a location of the M2M device 50 based on the received signal measurements.

By using M2M devices 50 already located in a geographic area 40, the location database 20 may be populated with fingerprint data for multiple geographic locations without requiring human interaction, e.g., without requiring that an individual drive around the geographic area 40 while collecting fingerprint data at multiple different locations. This is especially advantageous when it is desirable to update the location database 20 due to changes in the network, e.g., the deployment of additional base stations. For example, the use of M2M devices 50 makes it easier and more cost effective to add location and fingerprint data to the location database for an M2M device 50 previously unrepresented in the location database 20. Further, the use of M2M devices 50 makes it easier and more cost effective to update the fingerprint data for an M2M device 50 already represented in the location database 20. Thus, the solution presented herein provides a simpler and more cost effective way to provide fingerprint data used for fingerprint location techniques, particularly as more M2M devices become available for fingerprint data collection.

Figure 5:
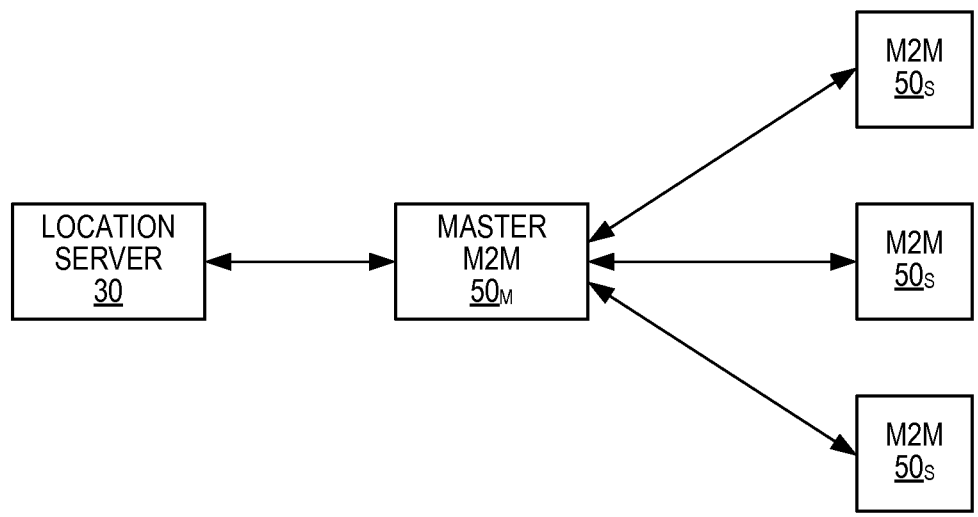
FIG. 5 shows a functional diagram for data collection according to another exemplary embodiment.
Figure 6:
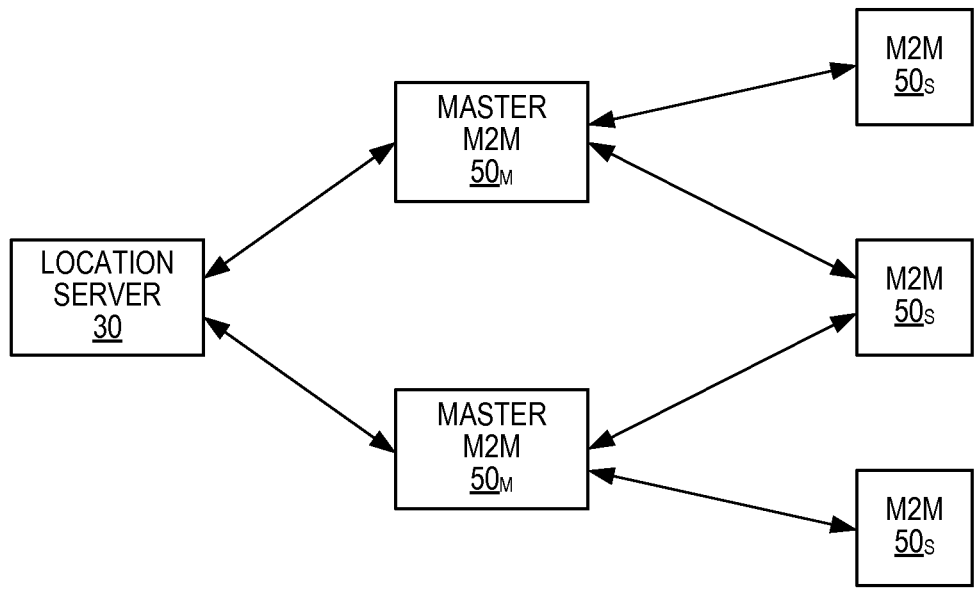
FIG. 6 shows a functional diagram for data collection according to another exemplary embodiment.

The discussion so far has involved only the collection and transmission of fingerprint data by each M2M device 50 in the geographic area 40. To reduce the signaling load required to provide such information to the location database 20, some embodiments may designate an M2M device 50 as a "master" M2M device $50_M$ that not only collects its own fingerprint data, but also receives and provides additional fingerprint data from one or more "subordinate" M2M devices $50_S$. FIGS. 5 and 6 show exemplary embodiments involving master and subordinate M2M devices 50. In FIG. 5, multiple subordinate M2M devices $50_{S1}$, $50_{S2}$, $50_{S3}$ report their collected data to one master M2M device $50_{M1}$. In FIG. 6, each subordinate M2M device $50_{S1}$, $50_{S2}$, $50_{S3}$ reports its collected fingerprint data to one or more master M2M devices $50_{M1}$, $50_{M2}$. In both cases, the master M2M device $50_M$ transmits all of the collected fingerprint data for storage in the location database 20. While each master M2M device $50_M$ is typically a "fixed" M2M device $50A_M$, the subordinate M2M devices $50_S$ may be fixed or mobile subordinate M2M devices $50_S$.

When the subordinate M2M devices $50_S$ are proximate the master M2M device $50_M$, the fingerprint data collected by each M2M device 50 is likely similar. In such embodiments, the master M2M device $50_M$ may therefore reduce the amount of fingerprint data requiring transmission by determining and transmitting one or more delta values for the subordinate devices $50_S$. For example, the master M2M device $50_M$ may determine one or more fingerprint delta values from the difference(s) between the fingerprint data collected by the master M2M device $50_M$ and the fingerprint received from a subordinate M2M device $50_S$. The master M2M device $50_M$ therefore sends its collected fingerprint data and any determined delta values to the location server 30. The location server 30 subsequently determines the fingerprint data for each of the subordinate M2M devices $50_S$, and stores the fingerprint data received from the master device $50_M$ and the fingerprint data determined for the subordinate M2M devices $50_S$ in the location database 20.

It will be appreciated that the transfer of collected fingerprint data, whether between an M2M device 50 and the location server 30/location database 20 or between a master M2M device $50_M$ and a subordinate M2M device $50_S$, may be achieved using any wireless communication technologies, including but not limited to cellular, WiFi, Bluetooth, etc.

The fingerprint data collected by the M2M devices 50 may be used for any fingerprint positioning process. Further, the collected fingerprint data may be used to generate additional databases, e.g., the AECID database 24, used for more refined fingerprint positioning processes, as briefly discussed below.

The AECID positioning method is based on the idea that high precision positioning measurements, e.g. A-GNSS measurements, can be seen as points that belong to regions where certain cellular radio propagation condition persist. A-GNSS or other high accuracy positioning methods are performed at the same time as UE network signal measurements. The AECID positioning method tags high precision measurements according to certain criteria, e.g., the fingerprint data criteria disclosed herein, where any number of M2M devices 50 may provide the high precision measurements. A tag comprises a vector of indices, where each index takes an enumerable number of discrete values. Continuous variables used for tagging, e.g., path loss, hence need to be quantized. All of the high precision measurements that have the same tag are collected in separate high precision measurement clusters, where further processing of the data in each cluster may be performed in order to refine the data. In general, each cluster is associated with a particular geographical area, which may be smaller than a cell of the wireless network. More particularly, a polygon that represents the geographical extension of a high precision cluster is computed. When computing the polygon, the two most important considerations are to minimize the polygon (and thus maximize the accuracy), and to precisely know the probability that a particular UE 14 is within the polygon, where the probability is determined by the percentage of high precision measurements that survive the process of shrinking the polygon. The computed polygons are then stored in the AECID database 24. For an incoming positioning request for a UE 14, a network measurement by the UE 14 is firstly obtained. By looking up cell IDs or tags, the polygon corresponding to the determined tag is then looked up in the AECID database 24, followed by reporting, e.g. over RAN Application Part (RANAP) using the polygon format.

Additional details regarding the AECID process are not necessary to understand the solution presented herein, and are therefore not provided. It will be appreciated, however, that the M2M fingerprint data collection disclosed herein may also be used to populate an AECID database 24. For example, for fixed M2M devices 50A having fixed locations within the geographic area 40, e.g. road lamps/telegraph poles, it's straight forward to select those devices near a target area, e.g., by judging if the location of the M2M device 50 is in a defined circle, polygon, etc. If the M2M devices 50 have fixed locations together with similar identities, e.g. the road lamps/telegraph poles in a Park A have identities like Park A-1, Park A-2 etc., it's possible to pick up all the road lamps in Park A by their identities if Park A is part of the target area. Mobile M2M devices 50B, e.g. M2M devices 50B installed in a taxi or bus, need to have high accuracy position capabilities such as A-GNSS to be qualified for AECID data collection. In any event, the AECID data collection according to embodiments disclosed herein is carried out using M2M devices 50. Because conventional AECID data collection solutions required the use of a UE, such AECID data collection was problematic due to battery issues, privacy concerns, etc. In addition to providing a more cost effective solution, using M2M devices 50 as disclosed herein for AECID data collection mitigates the problems associated with conventional AECID data collection.

Figure 7:
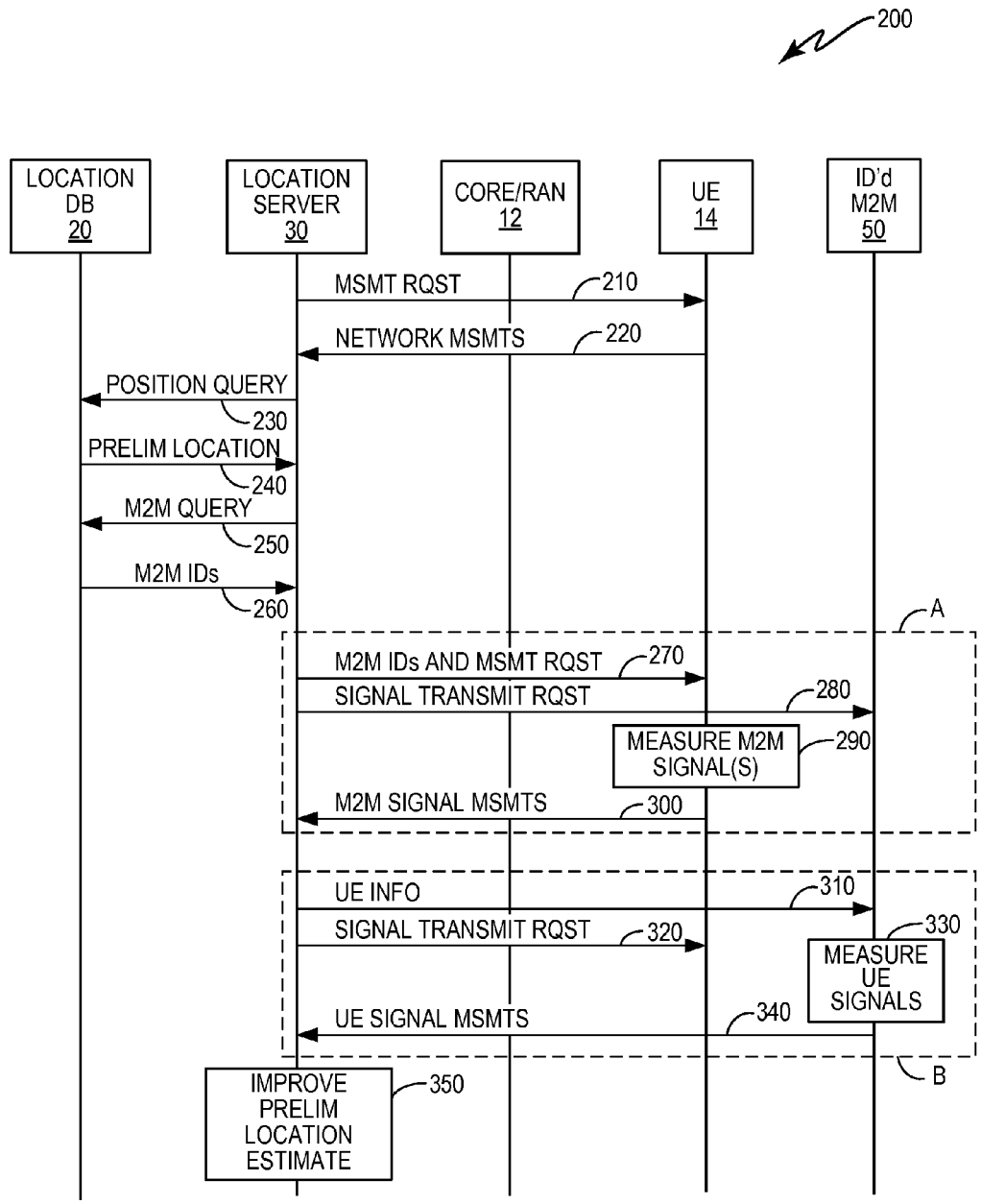
FIG. 7 shows a flow diagram for improving a location estimate according to one exemplary embodiment.

M2M devices 50 may also be used to help improve the positioning accuracy of the fingerprint-based location determination process, e.g., as shown by the process chart 200 of FIG. 7. For example, during the position determination process, the location server 30 may issue the request for network measurements from the UE 14 (item 210). The UE 14 replies with the requested network measurements (item 220). The location server 30 queries the location database 20 with the UE network measurements (item 230). The location database 20 replies with a preliminary location estimate (item 240). The location server 30 further queries the location database 20 using the preliminary location estimate (item 250), and retrieves information identifying the M2M devices 50 near the location estimate (item 260). The identified M2M devices 50 can be used to further communicate with the UE 14 to help get a location estimate with higher accuracy. For example, items 270-300 provide one example (e.g., embodiment A) for improving the location estimate. The location server 30 may send information regarding the identified M2M devices 50 to the UE 14 and trigger the UE 14 to further measure the signals from these M2M devices 50 (item 270). The location server 30 may need to send additional instructions to the identified M2M devices 50, e.g., to allow access to the M2M devices by the UE 14, to instruct the identified M2M devices 50 to transmit signals for the UE 14 to measure, etc. (item 280). The UE 14 measures the signals transmitted by the M2M devices 50 (item 290), and reports the measured M2M devices' signals to the location server 30 (item 300).

Items 310-340 provide another example for improving the location estimate, e.g., embodiment B. The location server 30 sends information regarding the UE 14 to the identified M2M devices 50, and triggers the identified M2M devices 50 to measure a signal transmitted by the UE 14 (item 310). The location server 30 may also need to trigger the UE 14 to transmit the signal and allow the M2M devices 50 to access to the UE 14 (item 320). The M2M devices 50 measure the signal transmitted by the UE 14 (item 330), and report the measurements to the location server 30 (item 340). After getting further signal measurements from the UE 14 or the identified M2M devices 50, the location server 30 can use the signal measurements to improve the initial location estimate (item 350). For example, the initial location estimate may be improved using well-known multi-lateral method. The multi-lateral method may, e.g., use received signal strength/quality, path loss, or timing information to deduce a location of a target device, which is known in the art and is therefore not elaborated further here.

The M2M solution disclosed herein has many advantages over conventional solutions. For example, by utilizing M2M devices characteristics, the quality, quantity, and efficiency of the data collection and the resulting fingerprint data will substantially increase. In addition, the M2M devices may be used to further improve the accuracy of fingerprint positioning, e.g., using device to device communication.

Various elements disclosed herein are described as some kind of circuit, e.g., a processing circuit, a collection circuit, a selection circuit, etc. Each of these circuits may be embodied in hardware and/or in software (including firmware, resident software, microcode, etc.) executed on a controller or processor, including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a location server in a wireless communication system, of collecting data for storage in a location database in the wireless communication system, the method comprising:
    receiving, by a transceiver of the location server, fingerprint data collected by one or more machine-to-machine (M2M) devices, each positioned at fixed locations in the wireless communication system, wherein each of the one or more M2M devices are configured for communication with the location server without human intervention, wherein the fingerprint data characterizes the radio environment at the fixed location of the corresponding M2M device, and wherein each M2M device corresponds to one fixed location in a fingerprint grid; and
    storing the fingerprint data received for each of the one or more M2M devices in the location database to associate the received fingerprint data with the fixed location of the corresponding M2M device,
    wherein the receiving the fingerprint data from the one or more M2M devices comprises receiving, from a master M2M device at a fixed location in the wireless communication system, the fingerprint data associated with the master M2M device and one or more subordinate M2M devices from the master M2M device, and
    wherein the storing the received fingerprint data comprises:
        determining the fingerprint data for each subordinate M2M device from the fingerprint data received from the master M2M device;
        storing the fingerprint data determined for each subordinate M2M device in the location database for each of the one or more subordinate M2M devices; and
        storing the fingerprint data received for the master M2M device in the location database.

2. The method of claim 1 further comprising:
    selecting the one or more M2M devices from a plurality of M2M devices in the wireless communication system; and
    sending a collection trigger from the location server to each of the selected M2M devices to trigger collection of the fingerprint data by the selected M2M devices.

3. The method of claim 2 wherein selecting the one or more M2M devices from the plurality of M2M devices comprises selecting the M2M devices proximate a target area.

4. The method of claim 2 wherein selecting the one or more M2M devices from the plurality of M2M devices comprises selecting the M2M devices having a fixed location known to a desired level of accuracy.

5. The method of claim 1 wherein:
receiving the fingerprint data associated with the one or more subordinate M2M devices comprises receiving one or more delta values associated with the one or more subordinate M2M devices, each delta value representing a difference between a fingerprint data point associated with one of the subordinate M2M devices and a corresponding fingerprint data point associated with the master M2M device; and
determining the fingerprint data for each M2M device comprises combining each delta value with a corresponding fingerprint data point associated with the master M2M device to determine the fingerprint data for each of the subordinate M2M devices.

6. The method of claim 1 wherein at least one of the one or more subordinate M2M devices comprises a mobile M2M device, the method further comprising receiving from the master M2M device location information regarding a location of the mobile M2M device and storing a location of the mobile M2M device determined based on the received location information with the corresponding fingerprint data in the location database.

7. The method of claim 1 further comprising:
receiving signal measurements associated with at least one of transmissions by a UE proximate the M2M device and transmissions by the M2M device; and
determining the fixed location of the M2M device based on the received signal measurements.

8. The method of claim 1 further comprising receiving location information from the one or more M2M devices indicating the fixed location of the corresponding M2M device.

9. The method of claim 1 wherein the one or more M2M devices comprise at least one new M2M device previously unrepresented in the location database, and wherein storing the received fingerprint data comprises automatically adding the fingerprint data associated with any new M2M device to the location database.

10. The method of claim 1 wherein the one or more M2M devices comprise an existing M2M device having previously collected fingerprint data stored in the location database, and wherein storing the received fingerprint data comprises automatically updating the fingerprint data associated with any existing M2M devices in the location database.

11. A location server comprising a processing circuit and a transceiver configured to implement the method of claim 1.

12. A method of collecting data for a location database in a wireless communication system at a machine-to-machine (M2M) device positioned at a fixed location within a fingerprint grid, the method comprising:
collecting fingerprint data based on a current radio environment, wherein the fingerprint data characterizes the radio environment at the fixed location of the M2M device, and wherein the M2M device is configured for communication with a remote network node without human intervention; and
transmitting, by a transceiver of the M2M device, the collected fingerprint data for storage in the location database to associate the fingerprint data with the fixed location of the corresponding M2M device,
wherein the M2M device comprises a master M2M device,
wherein the collecting the fingerprint data comprises:
collecting master fingerprint data based on the current wireless environment of the master M2M device; and
receiving, by the transceiver of the M2M device, additional fingerprint data from one or more subordinate M2M devices in the wireless communication network, wherein the one or more subordinate M2M devices collected the additional fingerprint data based on the current wireless environment of the associated subordinate M2M device, and
wherein the transmitting the collected fingerprint data comprises transmitting the fingerprint data associated with the master and subordinate M2M devices ($50_M$, $50_S$) for storage in the location database.

13. The method of claim 12 further comprising receiving a collection trigger from a location server in the wireless communication system, wherein collecting and transmitting the fingerprint data comprises collecting and transmitting the fingerprint data responsive to the collection trigger.

14. The method of claim 12 further comprising determining one or more delta values based on the received additional fingerprint data, each delta value representing a difference between an additional fingerprint data point and a corresponding master fingerprint data point, wherein transmitting the fingerprint data associated with the subordinate M2M devices comprises transmitting at least one of the determined delta values.

15. The method of claim 12 wherein at least one of the one or more subordinate M2M devices comprises a mobile M2M device, the method further comprising transmitting location information indicating the location of the mobile M2M device to facilitate storage of a location of the mobile M2M device in the location database with the corresponding fingerprint data.

16. The method of claim 12 further comprising:
receiving a measurement trigger from a location server in the wireless communication system to measure one or more signals transmitted by a UE;
measuring the one or more signals transmitted by the UE to determine one or more signal measurements; and
sending the one or more signal measurements to the location server to assist the location server in determining the fixed location of the M2M device within the fingerprint grid of the wireless communication system.

17. The method of claim 12 wherein transmitting the collected fingerprint data comprises transmitting the collected fingerprint data to a location server in the wireless communication system to enable the location server to store the collected fingerprint data in the location database.

18. The method of claim 12 wherein transmitting the collected fingerprint data comprises transmitting the collected fingerprint data directly to the location database.

19. The method of claim 12 further comprising transmitting location information indicating the fixed location of the fixed M2M device to facilitate storage of a location of the fixed M2M device in the location database with the corresponding fingerprint data.

20. The method of claim 12 wherein collecting and transmitting the fingerprint data comprises automatically collecting and transmitting the fingerprint data based on a current wireless environment according to a predetermined schedule.

21. The method of claim 12 further comprising comparing newly collected fingerprint data with previously collected fingerprint data, wherein transmitting the fingerprint data comprises transmitting the newly collected fingerprint data fingerprint data when a difference between the newly collected fingerprint data and the previously collected fingerprint data exceeds a threshold.

22. A machine-to-machine (M2M) device comprising a collection circuit and a transceiver configured to implement the method of claim 12.

23. A computer program product comprising a non-transitory computer readable storage medium storing program code configured when executed by a processor of a location server cause the processor to perform the method of claim 1.

* * * * *